US012580823B2

(12) United States Patent
Di Pietro et al.

(10) Patent No.: US 12,580,823 B2
(45) Date of Patent: Mar. 17, 2026

(54) ON-PREMISE MACHINE LEARNING MODEL SELECTION IN A NETWORK ASSURANCE SERVICE

(71) Applicant: Cisco Technology, Inc., San Jose, CA (US)

(72) Inventors: Andrea Di Pietro, Lausanne (CH); Jean-Philippe Vasseur, Saint Martin d'uriage (FR); Erwan Barry Tarik Zerhouni, Zürich (CH); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 1176 days.

(21) Appl. No.: 15/995,376

(22) Filed: Jun. 1, 2018

(65) Prior Publication Data

US 2019/0370218 A1    Dec. 5, 2019

(51) Int. Cl.
| | |
|---|---|
| *H04L 41/16* | (2022.01) |
| *G06F 18/21* | (2023.01) |
| *G06F 18/40* | (2023.01) |
| *G06N 20/00* | (2019.01) |
| *H04L 43/08* | (2022.01) |

(52) U.S. Cl.
CPC .......... *H04L 41/16* (2013.01); *G06F 18/2178* (2023.01); *G06F 18/40* (2023.01); *G06N 20/00* (2019.01); *H04L 43/08* (2013.01)

(58) Field of Classification Search
CPC .... G06N 20/00; G06K 9/6253; G06K 9/6263; H04L 43/08; H04L 41/16
See application file for complete search history.

(56) References Cited

U.S. PATENT DOCUMENTS

| | | | | |
|---|---|---|---|---|
| 10,949,535 B2 * | 3/2021 | Luo | | G06N 5/025 |
| 11,055,628 B2 * | 7/2021 | Kaniwa | | G06F 30/39 |
| 11,108,575 B2 * | 8/2021 | Kasaragod | | H04L 12/12 |
| 11,182,691 B1 * | 11/2021 | Zhang | | G06N 20/00 |
| 2014/0278807 A1 | 9/2014 | Bohacek | | |
| 2016/0078361 A1 * | 3/2016 | Brueckner | | H04L 67/10 |
| | | | | 706/12 |
| 2016/0110657 A1 * | 4/2016 | Gibiansky | | G06N 20/00 |
| | | | | 706/12 |
| 2016/0218933 A1 * | 7/2016 | Porras | | H04L 41/147 |

(Continued)

FOREIGN PATENT DOCUMENTS

CN          101782976 A          7/2010

*Primary Examiner* — Nicholas P Celani

(74) *Attorney, Agent, or Firm* — Lee & Hayes, P.C.

(57) ABSTRACT

In one embodiment, a network assurance service uses a first machine-learning based model that is locally deployed to a network to assess a set of input features comprising measurements from the network. The service monitors, locally in the network, performance of the first machine learning-based model. The service determines that the monitored performance of the first machine learning-based model does not meet one or more performance requirements associated with the network. The service selects a second machine learning-based model for deployment to the network, based on the one or more performance requirements associated with the network and on the set of input features of the first machine learning-based model. The service deploys the selected second machine learning-based model to the network as a replacement for the first machine learning-based model.

18 Claims, 6 Drawing Sheets

(56) References Cited

U.S. PATENT DOCUMENTS

| | | | | |
|---|---|---|---|---|
| 2017/0286839 A1* | 10/2017 | Parker | .................... | G06N 20/20 |
| 2018/0060759 A1* | 3/2018 | Chu | ........................ | G06N 20/00 |
| 2018/0189484 A1* | 7/2018 | Danahy | .................. | G06N 20/00 |
| 2019/0156247 A1* | 5/2019 | Faulhaber, Jr. | .......... | G06N 3/08 |
| 2019/0220697 A1* | 7/2019 | Kiemele | .............. | G06F 18/217 |

* cited by examiner

ON-PREMISE MACHINE LEARNING MODEL SELECTION IN A NETWORK ASSURANCE SERVICE

TECHNICAL FIELD

The present disclosure relates generally to computer networks, and, more particularly, to on-premise machine learning model selection in a network assurance service.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
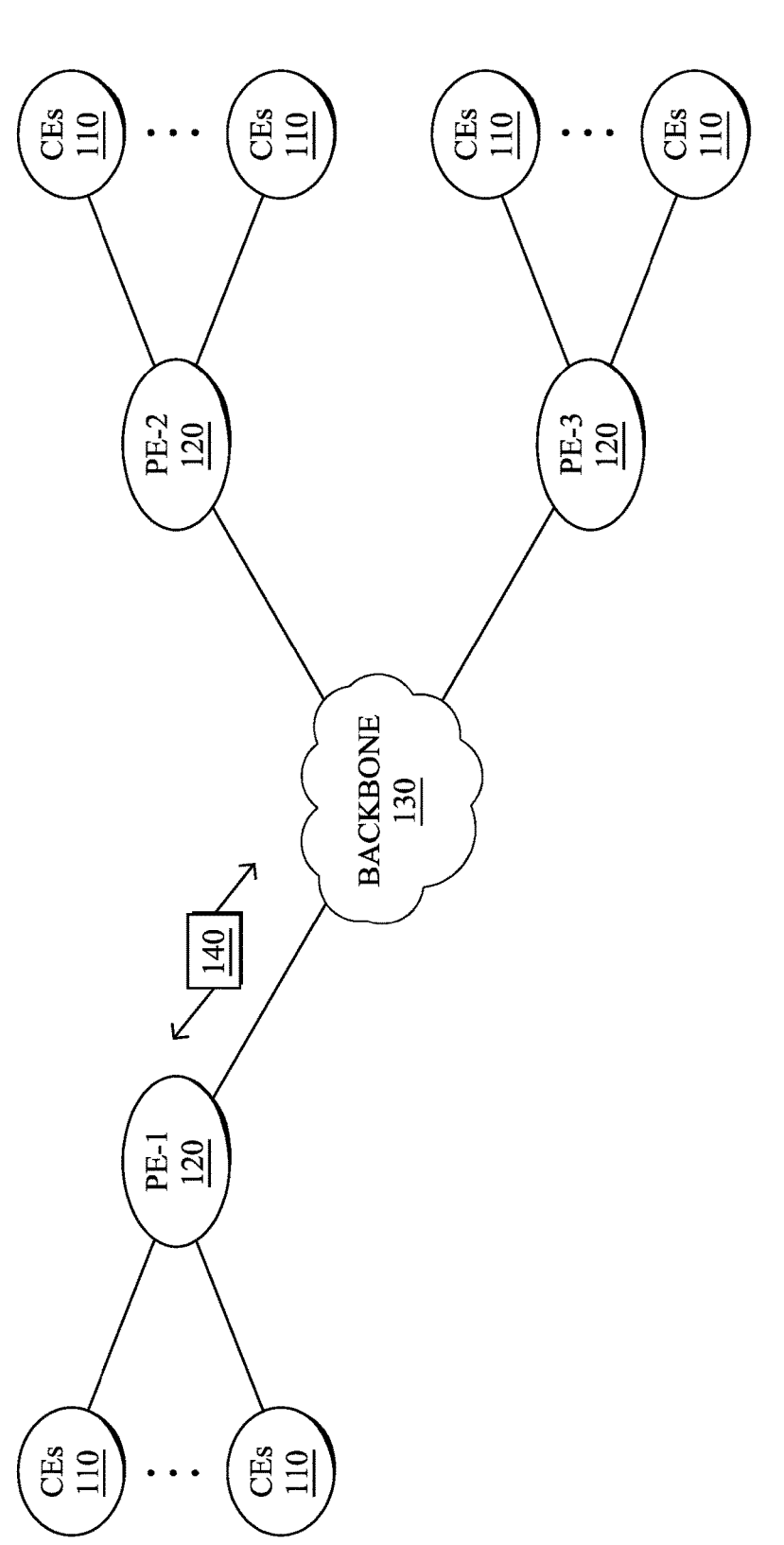
FIGS. 1A-1B illustrate an example communication network.

According to one or more embodiments of the disclosure, a network assurance service uses a first machine-learning based model that is locally deployed to a network to assess a set of input features comprising measurements from the network. The service monitors, locally in the network, performance of the first machine learning-based model. The service determines that the monitored performance of the first machine learning-based model does not meet one or more performance requirements associated with the network. The service selects a second machine learning-based model for deployment to the network, based on the one or more performance requirements associated with the network and on the set of input features of the first machine learning-based model. The service deploys the selected second machine learning-based model to the network as a replacement for the first machine learning-based model.

Description

A computer network is a geographically distributed collection of nodes interconnected by communication links and segments for transporting data between end nodes, such as personal computers and workstations, or other devices, such as sensors, etc. Many types of networks are available, with the types of networks ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
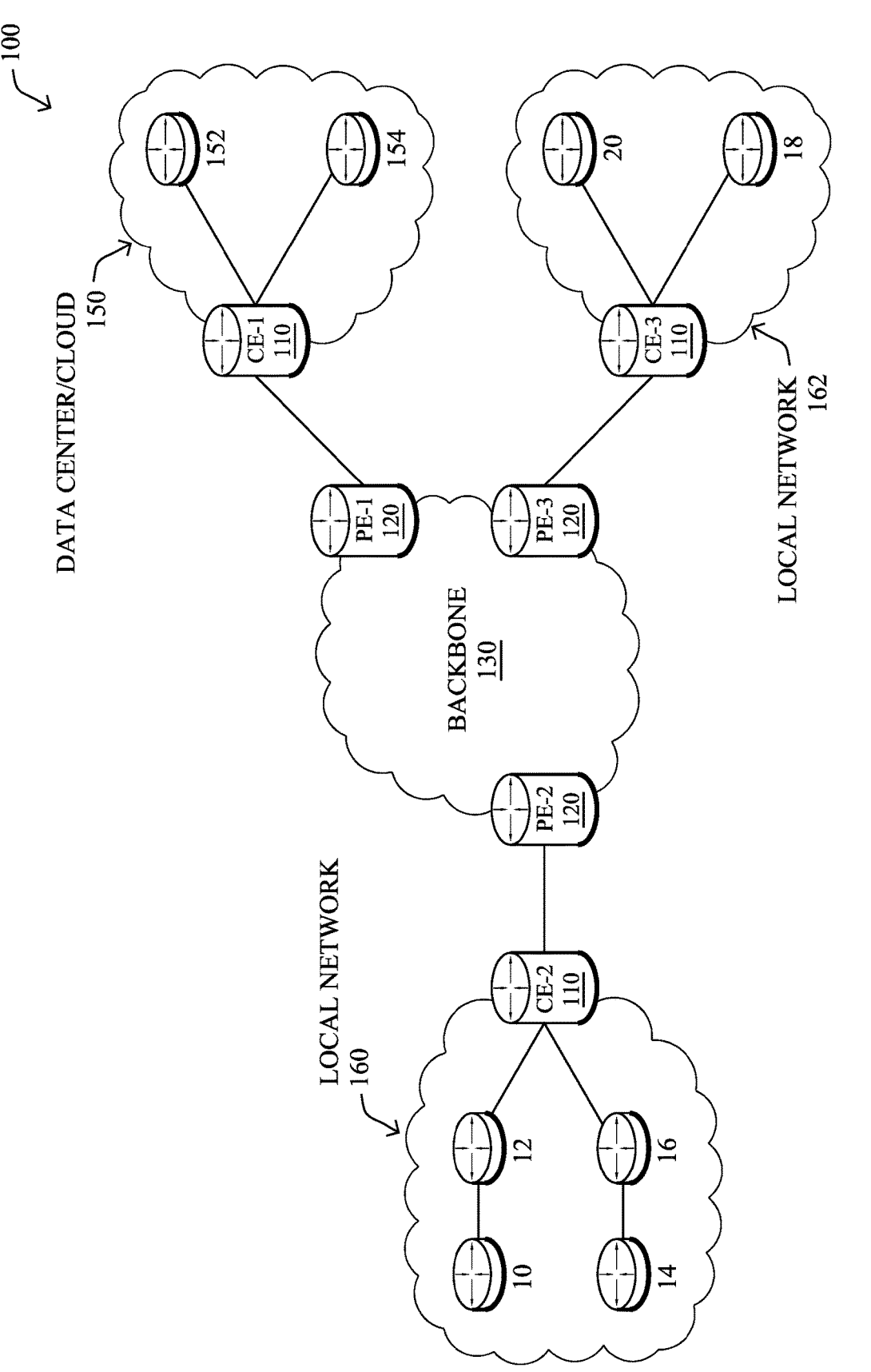

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
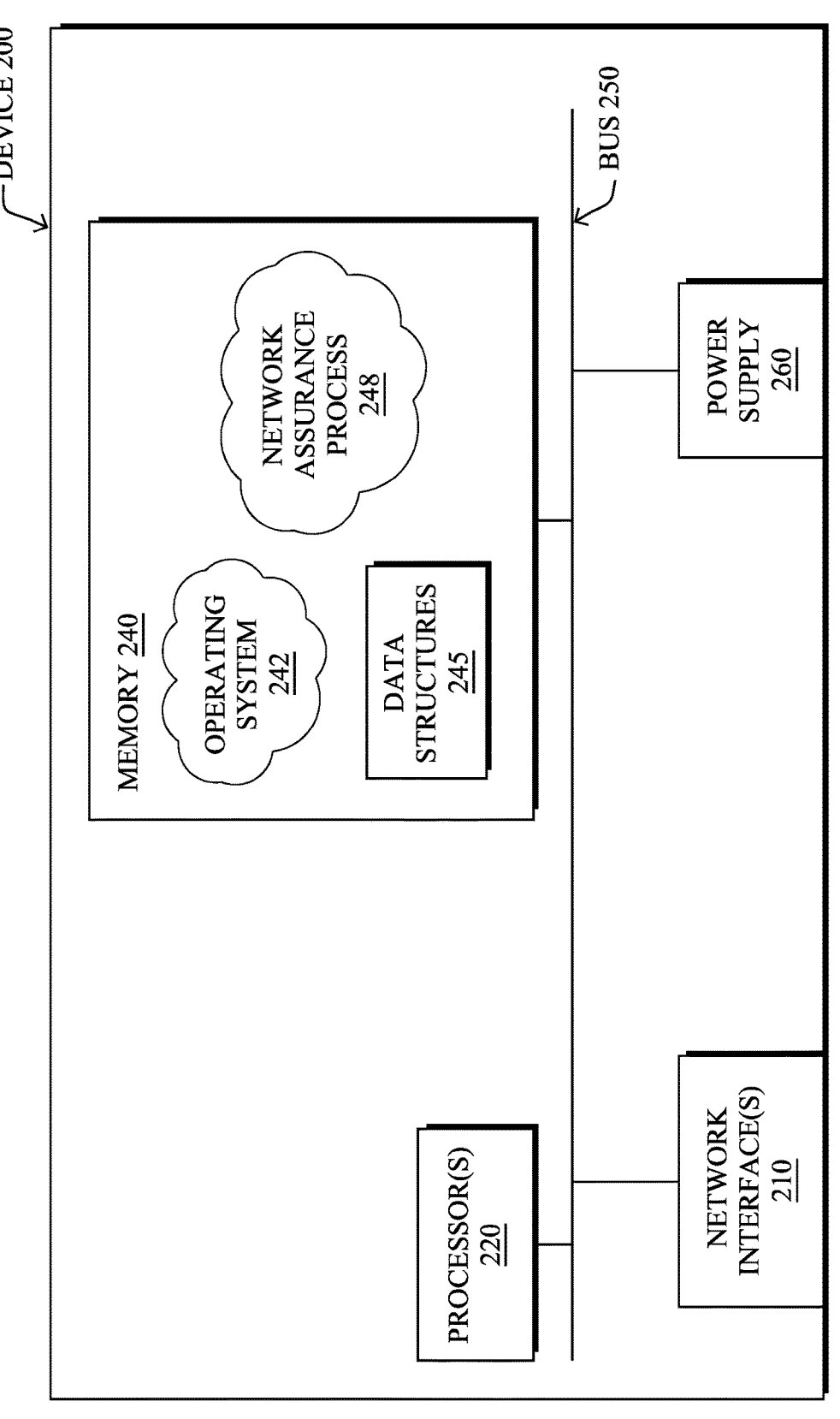
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted poor performance in the network or the presence of an anomalous condition. Conversely, the false negatives of the model may refer to the number of times the model predicted good performance when, in fact, poor performance occurred. True negatives and positives may refer to the number of times the model correctly predicted whether the performance was good or poor, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
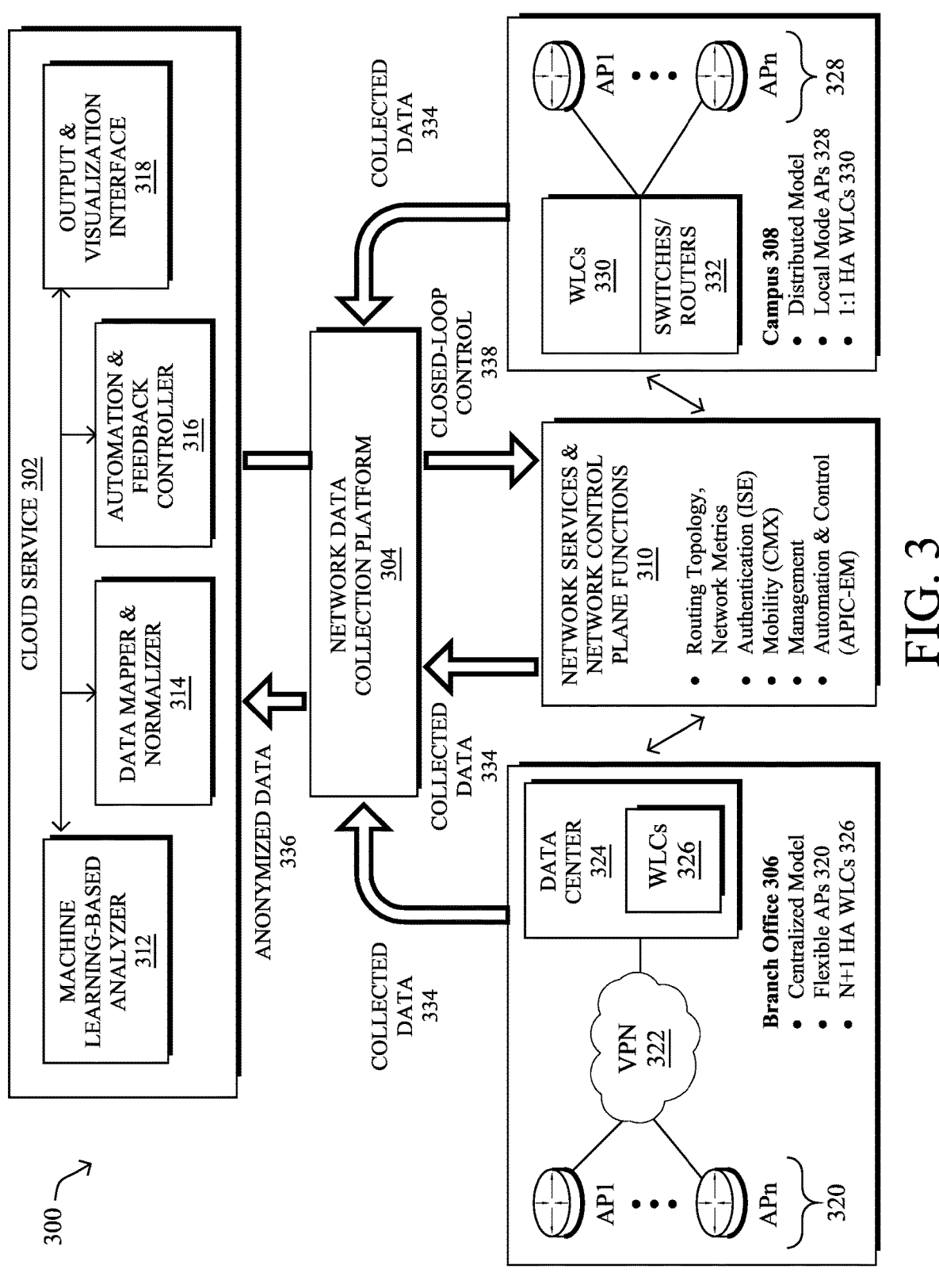
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, a key feature of network assurance cloud service 302 is its ability to leverage large datasets of measurements from a broad range of networks and across multiple organizations (e.g., businesses, schools, government entities, etc.). Doing so allows service 302 to tailor the machine learning models in its machine learning-based analyzer 312 to each network and/or organization. In other words, locating machine learning-based analyzer 312 in the cloud allows service 302 to:

Leverage both the network measurements for the specific organization under scrutiny, as well as measurements from any number of other networks or organizations, to train more accurate machine learning-based models in analyzer 312 for that organization. In other words, a cloud-based approach allows service 302 to apply cross-learning to the datasets from different networks or organizations.

Leverage the vast computational resources of the cloud, to accommodate for bursts in the computation requirements involved in model training.

Despite the benefits of a cloud-based network assurance service, there are certain situations in which a given network cannot use a cloud-based solution. For example, confidentiality requirements of the network may prevent data regarding the network to be sent to the cloud for analysis. In another example, it may not be practical to send the network measurements to the cloud for analysis, such as due to technical constraints. Thus, in some embodiments, some or all of network assurance service 300 shown in FIG. 3 may be implemented completely on premise so that little or no customer data is transmitted externally to the cloud.

In the case of an on-premise implementation of a network assurance service, a local agent may process telemetry data generated by the network using a pre-installed machine learning-based model. Since the telemetry data is not available to the cloud engine, and the on-premise agent typically does not have enough computational resources to train such a model using the local telemetry data, the pre-installed model may be computed in the cloud based on similar datasets and pushed to the local network for execution. This approach, however, has two important drawbacks:

The capability of the cloud computed model to accurately reflect the behavior of the local network depends on how statistically similar the datasets available to the cloud are to the local telemetry data.

Depending on the nature of the chosen model (e.g., the type of input features, temporal granularity, etc.) the computational resource requirements of the model evaluation can change dramatically. For example, some input features may require CPU-intensive computations, temporal features may require a large memory buffer, etc.

On-Premise Machine Learning Model Selection in a Network Assurance Service

The techniques herein introduce an architecture that allows for the dynamic selection of a machine learning-based model to be executed locally in a network as part of a network assurance service and without requiring the external transmission of telemetry data from the local network. In particular, the techniques herein allow for optimizing the tradeoff between model quality/performance and resource consumption in the local network. In further aspects, the techniques herein also disclose a mechanism whereby performance data regarding the model deployed to the local network can trigger custom model computation in the cloud.

Specifically, according to one or more embodiments of the disclosure as described in detail below, a network assurance service uses a first machine-learning based model that is locally deployed to a network to assess a set of input features comprising measurements from the network. The service monitors, locally in the network, performance of the first machine learning-based model. The service determines that the monitored performance of the first machine learning-based model does not meet one or more performance requirements associated with the network. The service selects a second machine learning-based model for deployment to the network, based on the one or more performance requirements associated with the network and on the set of input features of the first machine learning-based model. The service deploys the selected second machine learning-based model to the network as a replacement for the first machine learning-based model.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
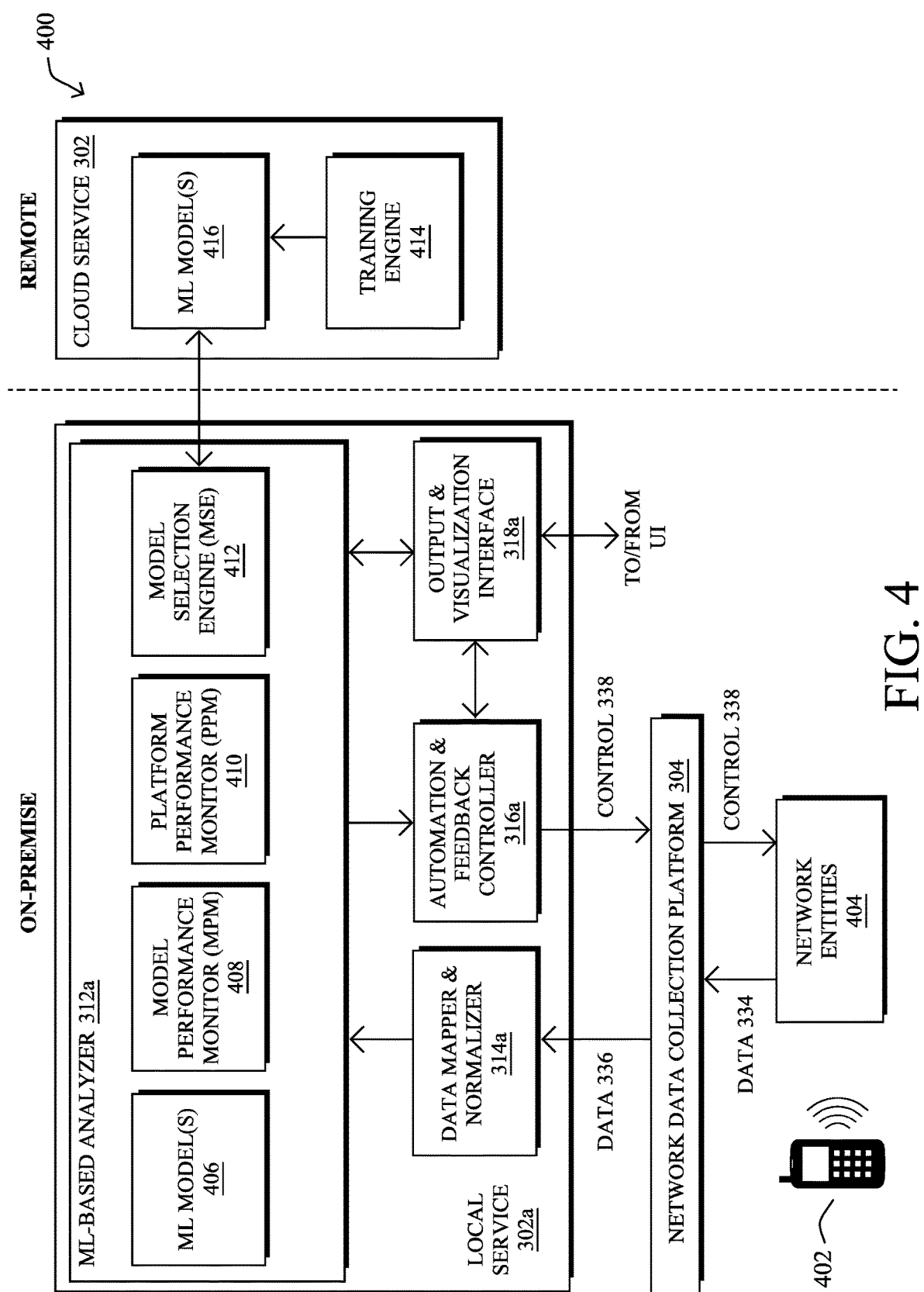
FIG. 4 illustrates an example architecture for selecting a machine learning model for local deployment to a network.

Operationally, FIG. 4 illustrates an example architecture 400 for selecting a machine learning model for local deployment to a network, according to various embodiments. As shown, any or all of the components of network assurance system 300 may be implemented on-premise, as part of the local network to be monitored. For example, assume that the local network comprises any number of network elements/entities 404 that communicate with one or more client devices 402 within the monitored network itself. Network entities 404 may include, but are not limited to, radios, APs, WLCs, routers, switches, servers, or the like. On top of network entities 404 may be network data collection platform 304 that gathers measurements/telemetry data 334 from network entities 404, either directly on network entities 404 or on devices in communication therewith.

In various embodiments, a local service 302a may also be implemented on-premise in the local network, to assess the telemetry data 334 collected locally by network data collection platform 304. In general, local service 302a may include any or all of the components 312a-318a of cloud service 302 to perform the functions described above, locally within the monitored network. For example, local service 302a may be implemented on one or more devices of the local network, allowing service 302a to assess the collected telemetry data 334 locally and without having to send these measurements to the external cloud service 302. In addition, in some cases, any alerts raised by local service 302a may be provided by output and visualization interface 318a to a user interface (UI) that is also on-premise, to further protect the data from the local network.

While local service 302a may not send collected network metrics externally, in some embodiments, local service 302a may still communicate with cloud service 302. For example, cloud service 302 may provide some degree of control over local service 302a, such as changing the configuration of local service 302a, adjusting the operation of local service 302a, or the like. In other words, in some cases, local service 302a may be seen as an extension of cloud service 302.

At the core of architecture 400 may be the following components: one or more machine learning model(s) 406 executed by local service 302a on-premise to assess the measurements/telemetry data 334 of the local network, a model performance monitor (MPM) 408, a platform performance monitor (PPM) 410, a model selection engine (MSE) 412, a training engine 414, and/or a set of machine learning-based models 416 generated by training engine 414. These components 406-416 may be implemented in the manner shown, in a distributed manner, or as their own services, either as part of the local network under observation or as a remote service (e.g., cloud service 302). In addition, the functionalities of the components of architecture 400 may be combined, omitted, or implemented as part of other processes, as desired.

A key aspect of the techniques herein is the ability for the system to monitor the performance of machine learning-based model(s) 406 executed on-premise by local service 302a (e.g., as part of machine learning-based analyzer 312a). To this end, local service 302a may include model performance monitor (MPM) 408 configured to assess the performance of model(s) 406. In various embodiments, MPM 408 may assess the performance of model(s) 406 based on any or all of the following:

feedback provided by one or more users via the UI regarding alerts raised by model(s) 406;

feedback from one or more other systems in the network, such as a network security system, etc., that are fed the outputs of model(s) 406;

various performance metrics generated by a model 406 itself (e.g., prediction error, etc.)

other information indicative of the performance of model(s) 406

From the assessment of any or all of the above data, MPM 408 may compute a performance score for the model(s) 406 that reflects how accurately the model reflects the on-premise network data. For example, in some cases, MPM 408 may compute the precision and/or recall of model(s) 406 as the performance score for model(s) 406. As would be appreciated, any desired performance score can be computed, in further implementations.

As noted, in one embodiment, MPM 408 may base the performance score of model(s) 406 in part on feedback received via the UI. In particular, output and visualization interface 318a may send alerts to the UI based on the assessment of the network measurements/telemetry data 336 (or simply telemetry data 334) gathered from the network. For example, such an alert may indicate that a particular measurement (e.g., client count, throughput, wireless onboarding time, DHCP errors, onboarding errors, etc.) is anomalous or otherwise indicative of an issue present in the monitored network. In turn, the user may be able to provide feedback to output and visualization interface 318a regarding whether the user believes the issue or alert is considered helpful. For example, the user may be able to select a like or dislike button, provide a star rating on a scale from 0-5, or the like.

In another embodiment, the feedback from the user can be inferred by output and visualization interface 318a based on the actions taken by the user via the UI. For example, the amount of time the user spends reviewing a particular alert or issue may indicate whether he or she believes the issue or alert to be of interest.

As noted above, another form of feedback that MPM 408 may use to compute the performance score for model(s) 406 may come from another system that leverages the assessment results of model(s) 406. For example, a third-party security system may consume the anomalies raised by model(s) 406 and accept or reject the anomaly based on a specific criterion (e.g., level of severity, etc.). Moreover, these forms of automatic feedback can also come from statistical methods. For example, a third-party system can score the predictions made by model(s) 406 statistically and send feedback to MPM 408 when the predictions deviate from a predefined statistical model by a threshold amount.

Another potential component of architecture 400 is platform performance monitor (PPM) 410. In various embodiments, PPM 410 may be configured to track the amount of resources available on the hosting device(s) of machine learning-based model(s) 406 and/or are consumed by the execution of model(s) 406. As would be appreciated, the set of input features for a machine learning-based model can greatly affect the amount of computational resources (e.g., CPU, memory, etc.) the model consumes. For example, if one of the inputs to a model 406 is a time series of measurements taken over time, this may consume a certain amount of memory, to store the measurement values in the time series.

According to various embodiments, architecture 400 may also include model selection engine (MSE) 412, which is configured to select a machine learning-based model for execution by local service 302a, based on the outputs of MPM 408 and/or PPM 410. In particular, MSE 412 may select one of machine learning-based models 416 on cloud service 302 for deployment to the on-premise network. For example, if the performance of a model 406 does not meet one or more performance requirements of the local network, either in terms of model results (e.g., as quantified by MPM 408) and/or in terms of the effects of the model on the platform (e.g., as quantified by PPM 410), MSE 412 may select a replacement model from among models 416 and deploy the replacement to the local network.

In some cases, each model 406 and/or 416 in architecture 400 may have any or all of the following associated metadata:

A set of performance requirements (e.g., a minimum precision or recall, etc.).

A list of required input features.

A list of optional input features (e.g., a list of input featured which can be optionally turned off in case model evaluation becomes too expensive).

In order to achieve an optimal performance/requirement trade-off, a number of different strategies for model selection can be adopted by MSE 412. In one embodiment, MSE 412 can start off with the most expensive available model 416 from cloud service 302, deploy it to local service 302a, and check the output of PPM 410 and/or MPM 408, in order to verify its performance impact. In another embodiment, MSE 412 may select a default model from among models 416 for execution by local service 302a, as a starting point for this optimization process.

In any case, MSE 412 will react to a significant decrease in the scores provided by MPM 408 and/or PPM 410. In particular, MSE 412 may perform any or all of the following:

If the output of PPM 408 shows that too many resources are being consumed by a model 406, then MSE 412 may first disable some optional input features of the model, before attempting to replace the model with one of model(s) 416. Then, if the resource consumption is still too high, MSE 412 may replace the model 406 on local service 302a to a simpler model 416, altogether.

If the output of MPM 408 shows that the generated issues/insights do not meet the user expectations, then MSE 412 may switch the responsible model 406 for another model 416 of the same complexity or to a more complex model.

Alternatively, MSE 412 may employ a policy-based approach that specifies the acceptable level(s) of resource consumption for a given model performance score from MPM 408. For example, when the CPU usage or the memory consumption is above a selected threshold, MSE 412 may select a lower computational (and performance) model 416 for deployment to local service 302a as a replacement. In particular, in order to avoid rapid fluctuations between models, the computational metrics such as CPU usage, memory usage, etc., may be monitored with a low granularity, while, on the other hand, MSE 412 may ensure there is enough feedback from the users and/or external system, before switching to another model.

In one embodiment, MSE 412 may automatically switch from one model to another (e.g., by replacing a model 406 with one of models 416), evaluate the performance of the selected model 416 and, if required, perform the selection again. In another embodiment, MSE 412 may simply send a model change recommendation to output and visualization interface 318a, to allow the user to review and complete any model changes.

Additionally, a limit may be specified in terms of level of performance for the model 406 under which a signal may be sent back to cloud service 302 and/or the user via output and visualization interface 318a that indicates when there is no model 416 available suitable for the available resources on the device(s) hosting local service 302a. Said differently, MSE 412 may also signal when the available resources on the hosting device(s) are insufficient to execute any of the model(s) 416 available from cloud service 302.

While MSE 412 is depicted in FIG. 4 as a component of local service 302a, further embodiments provide for MSE 412 to be hosted by cloud service 302, alternatively. In such an implementation, the outputs of MPM 408 and/or PPM 410 may be sent to cloud service 302, assuming that such a disclosure is allowed. Indeed, this data may still be acceptable for external use, even if the telemetry data 336 is not. In such a case, an MSE proxy agent can be implemented as part of local service 302a to perform any or all of the following:

forward the outputs of MPM 408 and/or PPM 410 to cloud service 302 using custom messages;

receive new models 416 from cloud service 302 via a custom model install message;

optionally transmit profiling information to cloud service 302 via a custom profile message; and/or optionally transmit information about its local resources of the device(s) hosting local service 302a (e.g., type of CPU, availability of GPU locally, etc.). Such information may be used by the MSE 412 on cloud service 302 to optimize the selection of features that would require the optimal resources on-premise.

In this particular embodiment, the MSE 412 on cloud service 302 has visibility over the entire dataset which can be used for model computation and can leverage the computing power of the cloud.

In another embodiment, the on-premise implementation of MSE 412 may be able to reduce the level of consumed resources by removing/modifying some of the input features used by a model 406. Indeed, there are many circumstances under which the cost of computation comes from the computation of input features, which may be costlier than running a model 416 trained in the cloud. In such a situation, MSE 412 of local service 302a may report the reduced input feature set to cloud service 302, so as to retrieve a new model 416 that uses this reduced input feature set.

In other words, MSE 412, in either the local or cloud case, may be configured to implement a model replacement strategy that includes:

choosing one replacement candidate from a large library of pre-computed models 416; and/or triggering the re-computation of a custom model 416 by training engine 414, based on a subset of the available datasets. Doing so allows cloud service 302 to create a model 416 which matches exactly the current requirements of the on-premise infrastructure. For example, the input features of the generated model 416 can be chosen by selecting a subset of input features that are available to local service 302a (e.g., as provided by the customer profile message sent to cloud service 302) and which is compatible with the available resources (as provided by the stats message from PPM 410).

In yet another embodiment, cloud service 302 may be able to make a suggestion of a reduced input feature set to MSE 412. For example, on analyzing the feedback from MSE 412, cloud service 302 may compute a custom-based model 416 for deployment to local service 302a using *fewer resource intensive input features*.

Figure 5:
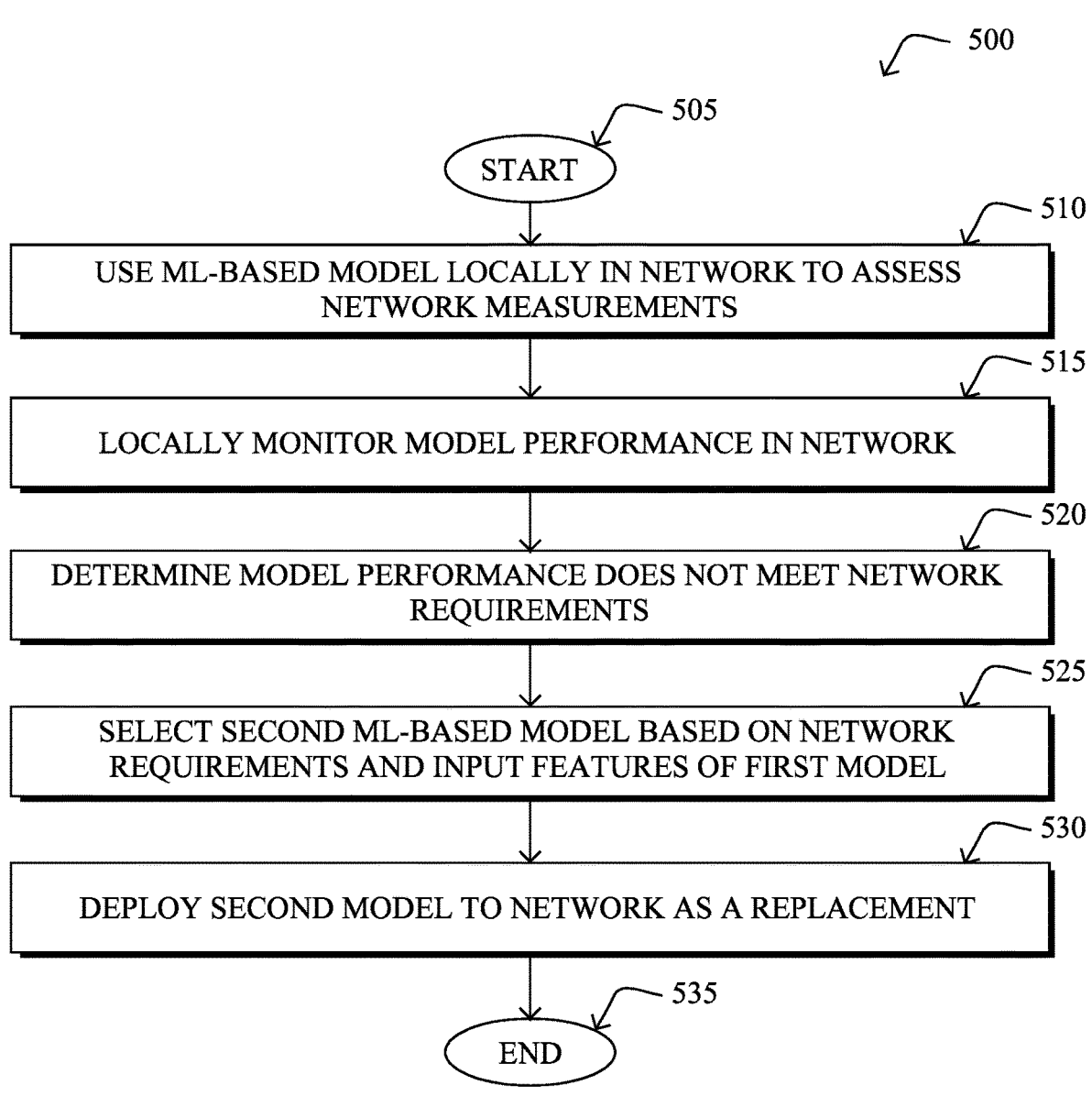
FIG. 5 illustrates an example simplified procedure for deploying a machine learning model for local execution in a network.

FIG. 5 illustrates an example simplified procedure for deploying a machine learning model for local execution in a network, in accordance with one or more embodiments described herein. For example, a non-generic, specifically configured device (e.g., device 200) may perform procedure 500 by executing stored instructions (e.g., process 248) to provide a network assurance service to a monitored network. The procedure 500 may start at step 505, and continues to step 510, where, as described in greater detail above, the network assurance service may use a first machine-learning based model that is locally deployed to the network, to assess a set of input features comprising measurements from the network. For example, such input features may include, but are not limited to, wireless onboarding statistics or errors, DHCP statistics or errors, throughput statistics or errors, network usage statistics (e.g., number of clients, etc.), radio statistics or failures, combinations thereof, or the like.

At step 515, as detailed above, the network assurance service may monitor the performance of the first machine learning-based model. In some embodiments, the performance of the model may be quantified in terms of how well the model accurately classifies or predicts network behaviors. For example, the service may monitor the performance, recall, or other statistic regarding how well the model is able to classify the input features or detect network anomalies. Such a performance score may be computed based on feedback from one or more users, other systems that rely on the outputs of the model, or the like. In further embodiments, the performance of the model may also be quantified in part by the amount of device resources are consumed by the model either directly or for purposes of computing the input features of the model. Notably, some input features can greatly increase the resource requirements of the model, which may or may not be available at all times by the hosting device(s).

At step 520, the network assurance service may determine that the monitored performance of the first machine learning-based model does not meet one or more performance requirements associated with the network, as described in greater detail above. For example, one situation may be that the first model consumes more than a threshold amount of resources on the hosting device(s). In another example, another situation may be that the model issues a greater than acceptable number of false positives.

At step 525, as detailed above, the network assurance service may select a second machine learning-based model for deployment to the network. In various embodiments, this selection may be based on the one or more performance requirements associated with the network and on the set of input features of the first machine learning-based model. In other words, the service may attempt to select a model that better optimizes the tradeoff between resource consumption by a model and the ability of the model to properly predict or assess the behavior of the network. For example, in some embodiments, the service may select the second model, if the second model consumes fewer resources than the first model currently deployed to the network and/or is expected to have higher precision or recall.

At step 530, the network assurance service may deploy the selected second machine learning-based model to the network as a replacement for the first machine learning-based model, as described in greater detail above. In this way, the service can replace the model used in the local network, as needed, using a model computed externally, such as model computed in the cloud using training data from any number of networks. In doing so, telemetry data can be analyzed on-premise by the deployed model without requiring the export of the telemetry data externally. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the on-premise deployment of a machine learning-based model as part of a network assurance service. In doing so, sensitive data can be analyzed on-premise, without the need to export this data to an external entity, such as a cloud-based service. In some aspects, the techniques herein also allow for the monitoring of the performance of the on-premise model and, if need be, the dynamic replacement of the model. Such a replacement may be made, in some cases, in an attempt to optimize the tradeoff between resource consumption by a model and the perceived performance of the model.

While there have been shown and described illustrative embodiments that provide for selecting machine learning models for on-premise deployment in a network assurance service, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such DHCP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

using, by a network assurance service, a first machine learning-based model that is locally deployed to a network to assess a set of input features comprising measurements indicative of behavior of the network;

monitoring, by the service and locally in the network, performance of the first machine learning-based model according to its resource consumption;

determining, by the service, that the monitored performance of the first machine learning-based model does not meet one or more performance requirements associated with the network based on an assessment that the resource consumption of the first machine learning-based model exceeds a maximum allowed resource consumption;

disabling, by the service, one or more optional input features of the first machine learning-based model, based on the determination that the monitored performance of the first machine learning-based model does not meet the one or more performance requirements associated with the network, wherein the one or more optional input features are selected based on a feature classification stored for the first machine learning-based model that associates each input feature with an estimated resource consumption value;

selecting, by the service and only after determining that the monitored performance of the first machine learning-based model still does not meet set-meet the one or more performance requirements associated with the network after disabling the one or more optional input features according to the feature classification until either the one or more performance requirements are satisfied or no additional optional input features remain, a second machine learning-based model from among a set of machine learning-based models for deployment to the network; and deploying, by the service, the selected second machine learning-based model to the network as a replacement for the first machine learning-based model.

2. The method as in claim 1, wherein the second machine learning-based model is trained based on measurements from one or more other networks different than the network where the first machine learning-based model is locally deployed.

3. The method as in claim 1, wherein monitoring the performance of the first machine learning-based model comprises:

receiving relevancy feedback from a user interface regarding alerts raised by the first machine learning-based model and sent to the user interface; and using the feedback to compute a precision or recall for the first machine learning-based model.

4. The method as in claim 1, wherein the second machine learning-based model is selected based on a determination by the service that the second machine learning-based model consumes fewer resources than the first machine learning-based model.

5. The method as in claim 1, further comprising:

deploying, by the service, the first machine learning-based model to the network, to test whether the performance of the first machine learning-based model satisfies the performance requirements associated with the network.

6. The method as in claim 5, further comprising:

selecting, by the service, the first machine learning-based model for deployment to the network from among the set of machine learning-based models, based on the first machine learning-based model requiring the most resources for execution from among the set of machine learning-based models.

7. The method as in claim 1, wherein monitoring the performance of the first machine learning-based model comprises:

receiving feedback regarding outputs of the first machine learning-based model from a network security system; and using the feedback to determine the performance of the first machine learning-based model.

8. The method as in claim 1, wherein the second machine learning-based model is selected by a cloud-based selection engine, the method further comprising:

sending an indication of the monitored performance of the first machine learning-based model to the cloud-based selection engine.

9. An apparatus, comprising:

one or more network interfaces;

a processor coupled to the network interfaces and configured to execute one or more processes; and a memory configured to store a process executable by the processor, the process when executed configured to:

use a first machine learning-based model that is locally deployed to a network to assess a set of input features comprising measurements indicative of behavior of the network;

monitor, locally in the network, performance of the first machine learning-based model according to its resource consumption;

determine that the monitored performance of the first machine learning-based model does not meet one or more performance requirements associated with the network based on an assessment that the resource consumption of the first machine learning-based model exceeds a maximum allowed resource consumption;

disable one or more optional input features of the first machine learning-based model, based on the determination that the monitored performance of the first machine learning-based model does not meet the one or more performance requirements associated with the network, wherein the one or more optional input features are selected based on a feature classification stored for the first machine learning-based model that associates each input feature with an estimated resource consumption value;

select, only after determining that the monitored performance of the first machine learning-based model still does not meet set-meet the one or more performance requirements associated with the network after disabling the one or more optional input features according to the feature classification until either the one or more performance requirements are satisfied or no additional optional input features remain, a second machine learning-based model from among a set of machine learning-based models for deployment to the network; and deploy the selected second machine learning-based model to the network as a replacement for the first machine learning-based model.

10. The apparatus as in claim 9, wherein the second machine learning-based model is trained based on measurements from one or more other networks different than the network where the first machine learning-based model is locally deployed.

11. The apparatus as in claim 9, wherein the apparatus monitors the performance of the first machine learning-based model by:

receiving relevancy feedback from a user interface regarding alerts raised by the first machine learning-based model and sent to the user interface; and using the feedback to compute a precision or recall for the first machine learning-based model.

12. The apparatus as in claim 9, wherein the second machine learning-based model is selected based on a determination by the apparatus that the second machine learning-based model consumes fewer resources than the first machine learning-based model.

13. The apparatus as in claim 9, wherein the process when executed is further configured to:

deploy the first machine learning-based model to the network, to test whether the performance of the first machine learning-based model satisfies the performance requirements associated with the network.

14. The apparatus as in claim 13, wherein the process when executed is further configured to:

select the first machine learning-based model for deployment to the network from among the set of machine learning-based models, based on the first machine learning-based model requiring the most resources for execution from among the set of machine learning-based models.

15. The apparatus as in claim 9, wherein the apparatus monitors the performance of the first machine learning-based model by:

receiving feedback regarding outputs of the first machine learning-based model from a network security system; and using the feedback to determine the performance of the first machine learning-based model.

16. The apparatus as in claim 9, wherein the second machine learning-based model is selected by a cloud-based selection engine, and wherein the process when executed is further configured to:

send an indication of the monitored performance of the first machine learning-based model to the cloud-based selection engine.

17. A tangible, non-transitory, computer-readable medium storing program instructions that cause a network assurance service to execute a process comprising:

using, by the network assurance service, a first machine learning-based model that is locally deployed to a network to assess a set of input features comprising measurements indicative of behavior of the network;

monitoring, by the service and locally in the network, performance of the first machine learning-based model according to its resource consumption;

determining, by the service, that the monitored performance of the first machine learning-based model does not meet one or more performance requirements associated with the network based on an assessment that the resource consumption of the first machine learning-based model exceeds a maximum allowed resource consumption;

disabling, by the service, one or more optional input features of the first machine learning-based model, based on the determination that the monitored performance of the first machine learning-based model does not meet the one or more performance requirements associated with the network, wherein the one or more optional input features are selected based on a feature classification stored for the first machine learning-based model that associates each input feature with an estimated resource consumption value;

selecting, by the service and only after determining that the monitored performance of the first machine learning-based model still does not meet the one or more performance requirements associated with the network after disabling the one or more optional input features according to the feature classification until either the one or more performance requirements are satisfied or no additional optional input features remain, a second machine learning-based model from among a set of machine learning-based models for deployment to the network; and deploying, by the service, the selected second machine learning-based model to the network as a replacement for the first machine learning-based model.

18. The tangible, non-transitory, computer-readable medium as in claim 17, wherein the second machine learning-based model is trained based on measurements from one or more other networks different than the network where the first machine learning-based model is locally deployed.

* * * * *